United States Patent [19]

Fochtman et al.

[11] Patent Number: 4,864,942

[45] Date of Patent: Sep. 12, 1989

[54] PROCESS AND APPARATUS FOR SEPARATING ORGANIC CONTAMINANTS FROM CONTAMINATED INERT MATERIALS

[75] Inventors: Edward G. Fochtman, Elmhurst; Peter S. Daley, Glenn Ellyn; Milton Ader, Park Forest; Albert G. Plys, South Holland; Carl P. Swanstrom, Crestwood, all of

[73] Assignee: Chemical Waste Management Inc., Oak Brook, Ill.

[21] Appl. No.: 143,891

[22] Filed: Jan. 14, 1988

[51] Int. Cl.$^4$ .............................................. B23K 3/02
[52] U.S. Cl. .................................. 110/226; 110/236; 110/244; 110/341
[58] Field of Search ............... 110/236, 226, 238, 237, 110/246, 346, 341

[56] References Cited

U.S. PATENT DOCUMENTS

| | | | |
|---|---|---|---|
| 1,444,794 | 2/1923 | Kernan . | |
| 2,602,388 | 7/1952 | Elliott et al. | 97/10 |
| 2,775,174 | 12/1956 | Petrick | 97/10 |
| 3,744,221 | 7/1973 | Ross | 55/263 |
| 3,751,267 | 8/1973 | Sachnik | 99/81 |
| 3,859,933 | 1/1975 | Von Klenck | 110/226 |
| 4,052,151 | 10/1977 | Reichrt et al. | 432/115 |
| 4,098,200 | 7/1978 | Dauvergne | 110/204 |
| 4,140,478 | 2/1979 | Kawakami et al. | 432/13 |
| 4,167,909 | 9/1979 | Dauvergne | 110/207 |
| 4,177,575 | 12/1979 | Brooks | 34/13 |
| 4,295,972 | 10/1981 | Kamei | 210/710 |
| 4,301,750 | 11/1981 | Fio Rito et al. | 110/226 X |
| 4,420,901 | 12/1983 | Clarke | 47/1.44 |
| 4,441,880 | 4/1984 | Pownall et al. | 432/13 |
| 4,451,231 | 5/1984 | Murray | 432/13 |
| 4,466,361 | 8/1984 | Henery et al. | 110/346 |
| 4,469,720 | 9/1984 | Morris | 427/345 |
| 4,494,967 | 1/1985 | Barth | 55/74 |
| 4,504,222 | 3/1985 | Christian | 432/139 |
| 4,544,374 | 10/1985 | Mallek et al. | 48/114 |
| 4,546,711 | 10/1985 | Kerwin | 110/246 |
| 4,572,083 | 2/1986 | Griffith | 110/215 |
| 4,576,572 | 3/1986 | Mueller et al. | 432/13 |
| 4,621,437 | 11/1986 | Grande et al. | 34/10 |
| 4,628,828 | 12/1986 | Holtham et al. | 110/165 |
| 4,648,332 | 3/1987 | Goedhart | 110/346 |
| 4,667,609 | 5/1987 | Hardison et al. | 110/236 |
| 4,715,965 | 12/1987 | Sigerson et al. . | |
| 4,738,206 | 4/1988 | Noland | 110/226 X |
| 4,765,255 | 8/1988 | Chiarua | 110/226 |
| 4,782,625 | 11/1988 | Gerken et al. . | |

OTHER PUBLICATIONS

Webster, David M., "Enclosed Thermal Soil Aeration for Removal of Volatile Organic Contamination", *Journal of the Air Pollution Control Assoc.*, vol. 36, No. 10 (Oct. 1986), pp. 1156–1163.

"Soil Aeration Pilot Study Work Plan", *Canonie Engineers*, Project CH 84-130, (Oct. 1985).

*A Guide to Innovative Thermal Hazardous Waste Treatment Process*; McCoy and Associates, May/June 1988.

*Low Temperature Stripping of Volatile Compounds*; Velazquez et al., Sept. 1987.

*Primary Examiner*—Edward G. Favors
*Attorney, Agent, or Firm*—Allegretti & Witcoff, Ltd.

[57] ABSTRACT

A method for economically separating organic contaminants such as volatile organic chemicals (VOC's) and polychlorinated biphenyls (PCB's), even if the contaminants are present at low concentrations, from inert materials such as soils or sludges, comprising subjecting inert materials contaminated with organic compounds to a temperature effective to volatilize the organic contaminants but below incineration temperature, with continuous removal and condensation of evolved vapors, for a period of time sufficient to effect the desired degree of separation of contaminants.

22 Claims, 4 Drawing Sheets

PROCESS AND APPARATUS FOR SEPARATING ORGANIC CONTAMINANTS FROM CONTAMINATED INERT MATERIALS

FIELD OF THE INVENTION

The invention concerns an economical process for decontaminating inert materials contaminated with organic compounds. More particularly, the invention concerns a process and apparatus for thermally separating organic contaminants such as volatile organic chemicals (VOC's) and polychlorinated biphenyls (PCB's), even if the contaminants are present at low concentrations, from inert materials such as soils or sludges, leaving organically decontaminated inert materials. The removed contaminants are condensed and collected for further treatment.

BACKGROUND OF THE INVENTION

Highly halogenated organic chemicals are favored in industry for their many useful properties, such as stability under heat and pressure. However, these chemicals are sometimes toxic to flora and fauna. Improper disposal or spills of these organic chemicals may contaminate the environment. Cleanup is necessary due to the considerable health hazard and environmental stability of these chemicals.

In the past, an acceptable procedure for cleaning up a contaminated area involved removal of the contaminated soil or material to a designated secure landfill. Due to recent and upcoming Federal Regulations, the types and amounts of organic materials that can be disposed of in such a designated landfill have been greatly reduced. Therefore, there is a growing need to sanitize soils with an efficient and economical treatment process.

At present, the only generally accepted treatment technology for destroying highly halogenated organic contaminants is incineration. Application of incineration to soil treatment is inefficient because the contaminants to be incinerated are adhered to a large mass of inert material. In treating soil, incineration would involve collecting, packaging and transporting a large mass of contaminated material to a licensed incineration facility, heating the large mass of inert solids to very high incineration temperatures to decompose the proportionately small amount of target contaminants, and packaging and returning the materials back to the treatment site from where they were removed, or disposed of in a secure landfill.

In addition to the labor cost, the transportation cost, and the energy cost there is also a problem in that the capacity of present licensed incineration facilities is currently limited. Further, during incineration some of the halogenated contaminants may be converted to dioxin which is approximately 10,000 times as carcinogenic as an equal amount of PCB; thus special precautions must be implemented to prevent release into the atmosphere of this highly toxic by-product.

As an alternative to incineration, chemical processes have been developed for decontamination of contaminated soil, which basically involve treatment with a desorbent and dehalogenating agent. An example of such a chemical treatment is provided in U.S. Pat. No. 4,574,013 (Peterson). A typical reaction scheme involves concurrently reacting an alkali metal hydroxide with an alcohol to form an alkoxide and water; reacting the alkoxide with the unwanted halogenated aromatic contaminant to form an ether and a salt; permitting the ether to decompose to a phenol; and reacting the phenol with an alkoxide to form a water soluble phenate.

In such a chemical process the presence of water interferes with the chemical reaction scheme, thus the contaminated soil is preferably preliminarily dried to remove water. Drying involves removal of water, leaving dry contaminated soil. After the water has been removed, the soil is treated with the reagent and the chemical reaction is carried out in a basically sealed system. To accelerate the reaction, the contaminated soil may be mixed with the reagent in a cement mixer or similar device, with optional increase in temperature and pressure.

Similarly, U.S. Pat. No. 4,327,027 (Howard) discloses dehalogenation of halogenated aromatic compounds including PCB using anhydrous alkali metal salts of alcohols, preferably polyhydroxy alcohols. This reaction is also preferably carried out in an absence of moisture in a closed system.

Another dehalogenation technique is exemplified by U.S. Pat. No. 4,144,152 (Kitchens). Halogenated compounds, particularly PCB, are dehalogenated by photodegradation with UV radiation The treatment method may be adapted to decontamination of soil by first washing the soil with a UV transparent carrier, such as an organic solvent, preferably methanol rendered alkaline by addition of an alkali metal oxide or hydroxide, and then irradiating the UV transparent carrier containing the contaminant.

However, in the case where relatively small amounts of contaminants are adsorbed to large amounts of inert materials such as soil or sludge, each of the above techniques involves considerable expense and inconvenience. Transportation and energy costs are involved in conveying soil to an incineration facility and heating the large mass to incineration temperatures. The chemical treatment techniques are slow and may take weeks if not accelerated by increasing pressure or temperature, and involve the expense of startup and expended chemicals for treating soil to desorb and dehalogenate contaminants.

Accordingly, a keen need has been felt for a more efficient, economical system and apparatus for separating contaminants from contaminated soil, sludge and other inert materials. There is also a need for a system which is adaptable to being transportable to a contaminated area.

OBJECTIVES

An object of the present invention is to provide a process and apparatus capable of simply and efficiently separating contaminants from soils and sludges. Such a system must be capable of accepting a wide variety of contaminated feed materials and economically separating the contaminants from the inert material in a closed system so that there is no release of contaminants into the atmosphere.

Another objective is to provide a thermal separation process which operates at temperatures at which undesirable chemical reactions, such as the formation and evolution of dioxin as a by-product, do not occur.

Yet another object of the present invention is to develop a process which can economically and safely sanitize inert materials to a high degree.

The process and apparatus should be adaptable to being transportable to a treatment site, and as such able to operate independently of fixed utilities.

SUMMARY OF THE INVENTION

In a broad embodiment of the process according to the present invention, organic contaminants are separated from inert materials such as soils and/or sludges by a process comprising subjecting inert materials contaminated with an organic compound to a temperature effective to volatilize the organic contaminants but below incineration temperature, with continuous removal, condensation and collection of the evolved vapors, for a period of time sufficient to effect the desired degree of decontamination of the inert material.

When applying the inventive process to decontaminate a large amount of material, the process is preferably carried out with an indirectly heated air-tight rotary dryer. Indirect heating does not involve injection of air into the dryer, thus the problem of venting of contaminated combustion exhaust gases is avoided. The drying process is usually carried out under a slight vacuum, so that there can be no significant problem of emission into the atmosphere of any pollutants.

Temperatures are carefully controlled to keep the average solids temperature of the material being processed below 425° C., and for greater economy more usually below 325° F., so that there is no problem of formation of dioxins or dibenzofurans. At these temperatures the volatile component of the contaminated material vaporizes to form a gas phase, leaving behind an inert solid phase. The gaseous phase, which may contain fine solid particles, steam, air, an inert carrier gas, and vaporized organic contaminants such as VOC's and PCB's, is continuously drawn off from the dryer and is subsequently condensed and collected for further treatment or disposal by appropriate procedures.

BRIEF DESCRIPTION OF THE DRAWINGS

The process and apparatus in accordance with the present invention will be described with reference to the accompanying drawings, in which.

DETAILED DESCRIPTION OF THE INVENTION

Figure 1:
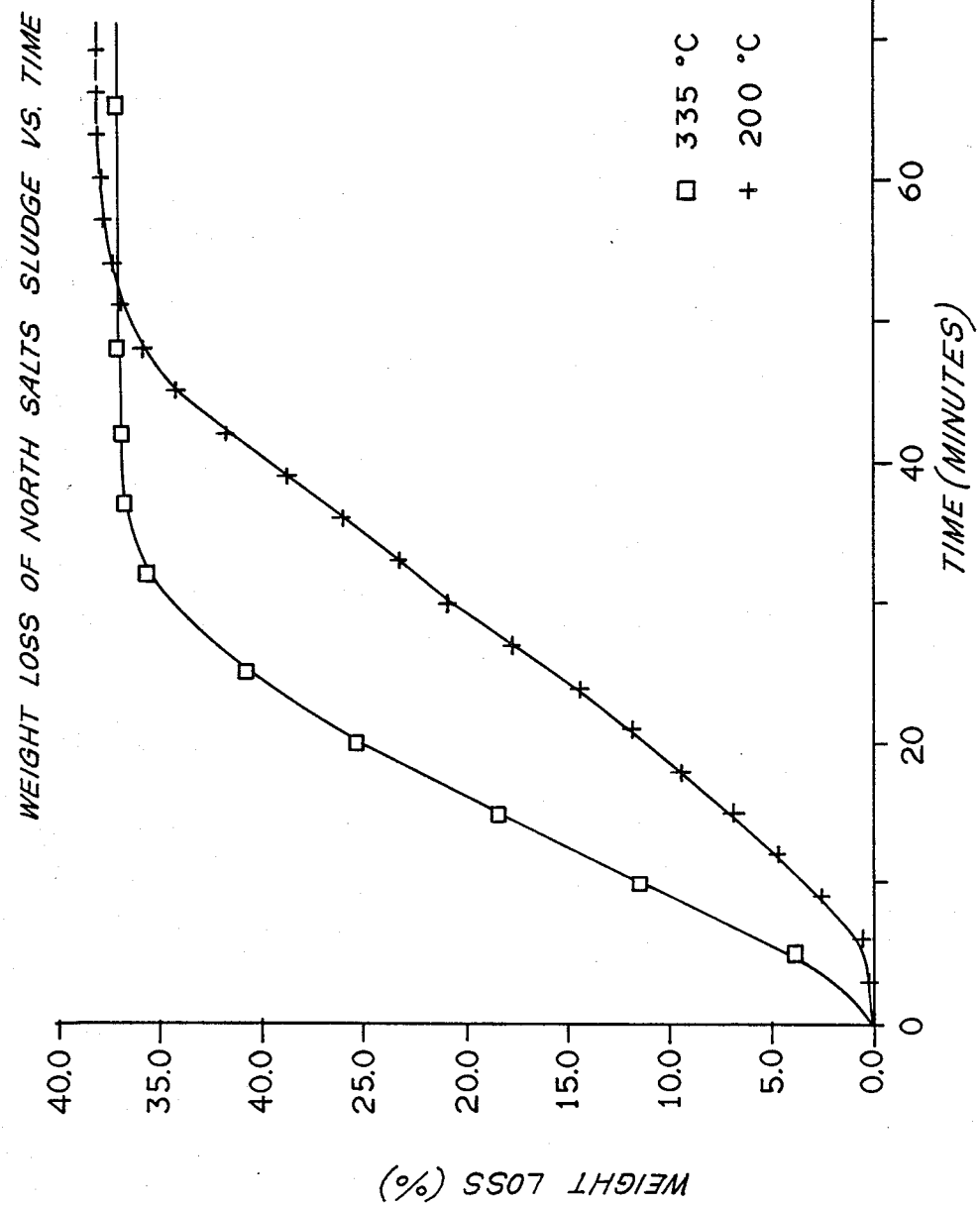
FIG. 1 shows typical curves of weight loss versus time for several runs with North Salts sludge at various temperatures.

Many types of contaminated inert materials, such as soil, sand, sludge and hazardous wastes such as contaminated pond sludges, filter cakes, etc., can successfully be treated in accordance with the present invention. The contaminated materials to be treated may collectively be referred to hereafter as "feed". The removal of contaminants by thermal evolution of vapor may be referred to as "drying".

The process has been found to be effective for the broad variety of organic contaminants and concentrations which are encountered in the chemical waste treatment business. While it would not be possible to list every contaminant to which the presently claimed thermal separation process may be applied, examples of organic contaminants which are likely to be present in the feed are polychlorinated aromatic compounds, and organic solvents. PCB's and pentachlorophenols (PCP's) are two exemplary organic compounds which may be thermally separated according to the present invention. The inventive treatment process has been shown effective in separating organic compounds whose vapor pressures (at 5° C.) ranges from 0.000001 to over 300 mm Hg.

While it has been the belief of skilled workers in the art that thermal sanitizing of inert materials requires heating the materials to incineration temperatures to cause decomposition of the halogenated organic contaminants, the present invention is based on the surprising discovery that it is possible at low temperatures (less than 325° C.) to successfully sanitize a broad variety of inert materials to a high degree. While it may be expected that some organic contaminants contained in contaminated inert materials volatilize upon application of heat to the contaminated inert materials, it is surprising that substantially complete removal of organic contaminants, including high boiling compounds, from a variety of inert materials can be effected at temperatures substantially lower than their boiling points and incineration temperatures.

During laboratory testing of the inventive process using bench scale equipment, it has been demonstrated that organic contaminants can be removed from soil/sludge by heating to a temperature of below 425° C., and for greater economy, preferably below 325° C. In one test, pond sludge containing nearly 1000 ppm PCB was heated at 300° C. for about one hour in air, whereupon the PCB concentration was reduced to less than 2 ppm. Other tests have also been performed, heating contaminated soil/sludge in a once through nitrogen atmosphere that similarly demonstrated the efficacy of the technique.

The mechanism by which complex materials are dried so that substantially complete removal of contaminants from inert materials occurs is complex and not completely understood, but it is believed that technological phenomena involved basically follow those disclosed in Paris, *Physical Chemists Handbook,* Section 21, which is incorporated herein by reference. The structure of the solids in the feed, the type of liquid contaminants and other liquids in the feed, the concentration of liquids, and the saturation of the gas phase determine the mechanism by which internal liquid flow and vaporization may occur. Liquid flow mechanisms can include (1) diffusion, (2) capillary flow, (3) flow caused by shrinkage and pressure gradients, (4) flow caused by gravity and (5) flow caused by vaporization condensation sequence.

Drying of feeds wherein the solids are of a complex structure and texture does not occur as a single continuous process but involves a number of distinct phases. A first phase in drying of contaminated inert material involves evaporation of liquids, which may be contaminants, water, or other liquids, from the saturated surface on the solid. This is followed in turn by a period of evaporation from a saturated surface of gradually decreasing area and, finally, when the surface of the solids in the feed is no longer saturated, to a period of evaporation from the interior of the solids.

The drying rate accordingly varies with temperature, time, solids composition, and moisture content. In a plot comparing vapor evolution versus time, distinct phases may be recognized. There is usually a first phase of gradually increasing evolution of vapors as the feed warms up. A second phase, known as the constant-rate phase, corresponds to the period in which a constant amount of vapor is evolved. The constant-rate phase continues until a point at which the rate of drying begins to fall, known as the point at which the "critical-moisture" content point is reached. After reaching the critical-moisture content point, the next phase is called the falling-rate phase. This phase is typified by a continuously changing rate throughout the remainder of the drying cycle, corresponding to the decrease in saturated surface area. A next point in the curve occurs at that point at which all the exposed surfaces become completely unsaturated and marks the start of the portion of the drying cycle during which the rate of internal moisture movement controls the drying rate.

Generally, the drying rate depends on factors affecting the diffusion of moisture away from the evaporating surface and those affecting the rate of internal moisture movement. Moisture which is held in the interstices of solids, or held as liquid on the surface, or is held as free moisture in cell cavities moves by gravity and capillary flow, provided that passageways for continuous flow are present. Moisture may move by vapor diffusion through the feed, provided that a temperature gradient is established by heating, thus creating a vapor-pressure gradient. Vaporization and vapor diffusion may occur in any feed in which heating takes place from one direction drying from the other and in which liquid is isolated between or inside granules of solid.

In the terminal phase, the drying rate is governed by the rate of internal moisture movement; the influence of external variables diminishes. This period usually predominates in determining the overall drying time to lower moisture content.

If the process according to the present invention is carried out in a continuous process, it will be understood that all of the above processes are occurring at the same time. It will also be understood that operating parameters may be varied to influence the above phenomena. For example, an additional inert gas may be passed over the drying feed to remove evolved vapors. In this way, the concentration of evolved vapors in the gas phase around the drying solids is lowered, and it becomes easier for the heated liquids to pass from the liquid phase into the vapor phase.

It is also the experience of the inventors that the presence of a small amount of water in the feed improves the effectiveness of the overall decontamination process. It is believed that as water in the interstitial spaces in the inert materials vaporizes and goes into the vapor phase, it carries contaminants along with it or otherwise facilitates the vaporization of the contaminants, i.e., by conditioning the gas phase to lower the vapor pressure at which the contaminants will pass into the vapor phase. Even though the largest portion of water present in the feed vaporizes at around the boiling point of water, some water nevertheless goes into the vapor phase together with low boiling organics, and sufficient residual water remains to be vaporized even in the feed which has been heated to a temperature above the boiling point of water, so that water is believed to play a significant role in increasing effectiveness of decontamination throughout a very broad range of temperatures.

In a broad embodiment of the process according to the present invention, organic contaminants are separated from inert materials such as soils and/or sludges by a process comprising subjecting the contaminated inert materials to a temperature effective to volatilize the organic contaminants but well below incineration temperature, with continuous removal of the evolved vapors, for a period of time sufficient to effect the desired degree of decontamination of the inert material.

When applying the inventive process to decontaminate a large amount of material, the process is preferably carried out with an indirectly heated air-tight rotary dryer. Solids temperatures are carefully maintained below 425° C., and for greater economy more usually below 325° C. At this temperature the volatile component of the contaminated material vaporizes to form a gas phase, leaving behind an inert solid phase. The gaseous phase, which may contain steam, air, an inert carrier gas, and vaporized organic contaminants such as VOC's and PCB's, is continuously drawn off from the dryer and condensed and collected for further treatment or disposal by appropriate procedures.

The specific operating parameters will vary depending on degree of wetness of the feed, the concentration and boiling point(s) of contaminant(s) in the feed (which can vary over a wide range), and the percentage of the contaminants to be removed from the feed. This system may be operated to remove virtually all VOC's and to render the treated substrate environmentally safe by EPA standards, or to the levels determined by specific job sites and requirements. For example, as shown above, PCB's can be reduced to less than 2 ppm or as required.

Accordingly, drying temperatures and dryer residence times may vary widely. However, the maximum average solids temperature should not exceed 425° C. Feed at a temperature of 425° C. may typically have a residence time of up to 90 minutes. Solids can be held longer at the operable temperature if required, although increase in residence time will reduce the capacity of the system.

While it is possible that solids may exit the dryer at temperatures up to 425° C. in some cases, it is more usual to have the solids exit at a temperature of from 225 to 325° C. Since the halogenated organic contaminants are not subject to temperatures above 325°–425° C. there will be no undesirable chemical changes to original constituents. Of great advantage is the fact that there will be no incidental creation of dioxin from halogenated hydrocarbons as presently occurs in incineration techniques. However, the presence of dioxin in the feed does not disturb the operation of the present invention.

The dryer preferably operates at a very slight vacuum (typically i.e. a"−" 0.1 to i.e., a"−" 2.0 inches water column) to insure that if the system is not positively air-tight, any leakage that might occur will draw air into the system, and not the reverse. This should prevent any environmental emissions.

A minimum gas velocity (typically 0.5 to 2.0 foot per second) should be maintained in the dryer to assure adequate vapor removal from the solids.

Water or steam may also be positively employed in the inventive process to help strip contaminants from the interstitial spaces. It is believed that as water volatilizes within and around the interstitial spaces it helps volatilize or strip organics, and that the flow of steam entrains and helps carry organics out of the dryer in the effluent gas stream.

Inert gas other than steam is preferably introduced into the system for additional stripping efficiency, preferably in a countercurrent flow through the dryer (i.e., in a direction opposite to the progress of the inert materials).

The inert gas carrier is used in the process primarily for safety to eliminate the risk of a fire in the dryer and to reduce the partial pressure of the overall atmosphere to more easily distill or boil off VOC contaminants. Nitrogen is preferably used for reasons of convenience and practicality. However, other inert gases such as, but not limited to, carbon dioxide, helium and argon, could also be used subject to price considerations, availability and composition of the feed material being processed.

The manner in which to carry out the present invention, and further features and advantages of the present invention, will be apparent from the following illustrative Examples. It will also become apparent that the apparatus and conditions may be varied widely while retaining the basic principle of the present invention. The Examples are to be considered illustrative, and are not in any way restrictive.

BENCH SCALE EXAMPLES

Sludge samples from two impoundments in New York were used: the first being North Salts sludge, the other Lagoon 2 sludge. Approximately 75 g of North Salts sludge or 95 g of Lagoon 2 sludge were used for each experiment. The sludge was stirred to form a homogeneous mixture. The mixture was spread (smeared) with a spatula to form a 12 mm thick layer inside an aluminum disk (75 mm dia. × 18 mm deep). The dish was placed on a metal platform inside a muffle furnace (Thermolyne Model 1400) which had been preheated to the temperature shown on FIG. 1 and 2. The platform was connected by a metal rod that passed through a hole in the bottom of the furnace to a disk resting on a top-loading electronic balance. Weight changes of as little as 0.1 gram could be read.

Sample temperature was monitored by means of a 0.020-inch diameter stainless steel-sheathed chromel-alumel thermocouple inserted into the soft sludge. The other end of the thermocouple passed through a small hole adjacent to the furnace door and was connected to either a direct-reading thermometer or millivolt strip recorder. Furnace temperature was read with another chromel-alumel thermocouple and controlled with a built-in percentage input device. While the sample was being heated, air was drawn through the furnace at a rate of about 0.5 liter/minute via glass tubing extending through a ¼-inch diameter hole drilled in the side of the furnace. The air then passed through a water-cooled Friedrichs condenser into a round-bottom flask (to collect condensates) and then through a water-filled gas scrubber. Despite the air flow, vapors and water condensate did escape around the loosely fitting furnace door.

Residues at the end of each experiment were friable and easily powdered with a mortar and pestle. In the case of the Lagoon 2 residues, pebbles were present but were removed by screening the powder through a 1 mm sieve. The product was reweighed s that results could be calculated on a pebble-free basis.

Experimental Results

Figure 2:
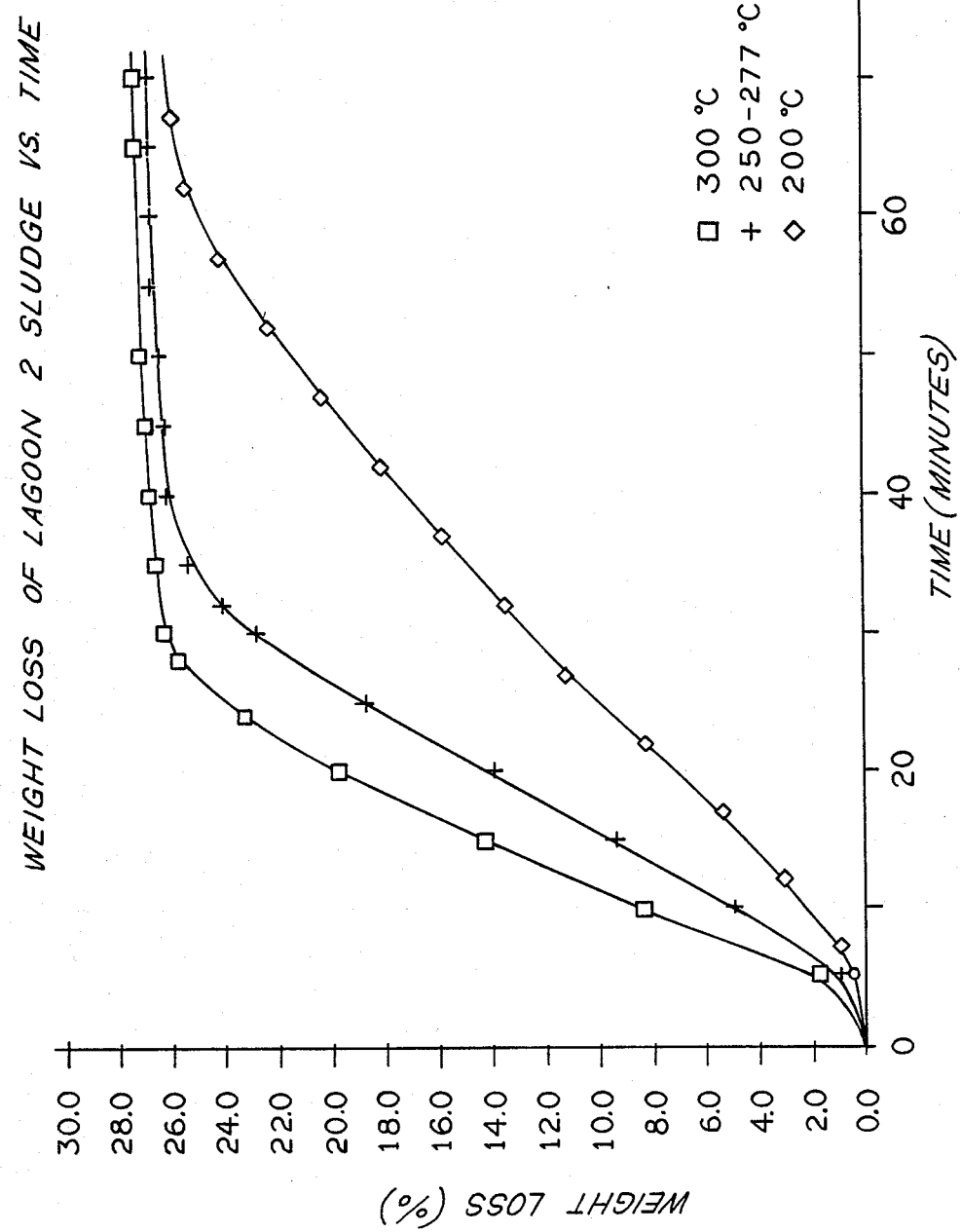
FIG. 2 shows typical curves of weight loss versus time for several runs with Lagoon 2 sludge at various temperatures.

FIGS. 1 and 2 show typical curves of weight loss versus time for several runs with both the North Salts and Lagoon 2 sludges. Only the initial 70 minutes are graphed since subsequent weight changes were almost negligible. The weight changes have been normalized to show grams lost per 100 g of sample, i.e. percent weight loss. It can be seen that the weight loss (or water content) of the North Salts sludge is about 10% greater than that of the Lagoon 2 sludge.

It should be noted that the rates at which sludge samples were heated up and water was evaporated are functions of the experimental set-up. They depend on the initial sample weights, sample geometry, sample container, power input and heat capacity of the (relatively small) furnace, air flow, etc. Thus, under the particular experimental conditions, it took about 65–75 minutes for the sample to reach 200° C.; about 45–50 minutes to reach 250° or 300° C.; and about 35 minutes to reach 335° C. Observations of sample temperature versus time showed that water was evaporated at about 100° C. for periods ranging from about 10 to 30 minutes, depending on experimental conditions.

Tables 1 and 2 list the weight loss and PCB content after various heating cycles of the North Salts and Lagoon 2 sludges.

TABLE 1

| VOLATILIZATION OF PCBs FROM NORTH SALTS SLUDGE | | | |
|---|---|---|---|
| HEAT TREATMENT | | WEIGHT LOSS | TOTAL PCBs |
| Temp., °C. | Time, hr | % | ppm |
| 100 | 2.5 | 35 | 68* |
| 100 | 2.5 | 35 | 76* |
| 200 | 6 | 38 | 3.6 |
| 200 | 16 | 38 | 4.6 |
| 335 | 6 | 38 | <1 |
| 335 | 16 | 38 | <1 |

*Approximately 3.7/1 ratio of Aroclors 1242/1260.

TABLE 2

| VOLATILIZATION OF PCBs FROM LAGOON 2 SLUDGE | | | |
|---|---|---|---|
| HEAT TREATMENT | | WEIGHT LOSS | TOTAL PCBs, |
| Temp., °C. | Time, hr | % | ppm |
| 90–95 | 3.7 | 25.4 | 984* |
| 200 | 1 | 26.1 | 627 |
| 250–277 | 1 | 26.7 | 120 |
| 300 | 0.25 | 26.7 | 48 |
| 305 | 0.5 | 26.5 | 44 |
| 300–340 | 1 | 28.0 | <1 |
| 300 | 2 | 27.4 | <5 |
| 300 | 4 | 27.6 | <5 |
| 300–340 | 6.3 | 27.4 | <1 |
| 375 | 1 | 28.4 | <1 |

*Approximately 6.6/1 ratio of Aroclors 1242/1260.

Measurement of PCB remaining after treatment at 90–100° C. served as base-line measurement of PCB contamination in the starting compositions. Analysis for PCBs in the dried, powdered analytical samples— by overnight Soxhlet extraction with 90% hexane-10% acetone and gas chromatographic analysis of the concentrated extract—gave more consistent results than direct extraction of the original water-containing sludge. At 100° C., not more than one- or two-tenths percent of the PCBs are volatilized over 2 to 4 hours. Thus, PCB removal was based on comparisons of the dried, water-free residues. The small differences in percent weight loss (due to water) for each series of experiments, though probably real, can be ignored for the purposes of the comparisons.

The North Salts sludge was tested first. Only 5 to 6% of the original 72 ppm (average) PCB concentration remained after heating at 200° C. for 6 to 16 hours. At the higher temperature of 335° C, the lower limit of PCB detection was reached, indicating that less than 1 ppm (about 1% of initial PCB) was left after 6 hours. A sludge with greater initial PCB content was needed to verify these apparently successful decontaminations. The Lagoon 2 sludge served this purpose.

Table 2 shows that Lagoon 2 sludge contained 984 ppm PCBs on a water-free basis. One hour's heating at 200, 250 to 277, or 300° to 340° C. volatilized successively larger amounts of PCBs, leaving 64, 12, and less than 0.1%, respectively, of the original PCB content. However, with shorter heating periods of 15 and 30 minutes at about 300° C., approximately 5% of the PCBs were not volatilized. Acceptable PCB removal apparently occurs after one hour at 300° C. The remaining experiments at longer heating intervals or at 375° C. gave further evidence that it is feasible at moderate temperatures to reduce PCB concentration in sludges to less than 2 ppm.

CONCLUSIONS

These experiments demonstrate that a simple heating at about 300° C. in air can decontaminate the test sludges so as to leave residues with 2 ppm or less PCBs. A cost comparison based on these sludges shows that cost savings with drying over incineration average $50 to $125/ton, and based on feed composition may be $140/ton or more.

PROPOSED COMMERCIAL SCALE UP OF PROCESS AND APPARATUS

In order to show how the inventive process may be scaled up for handling greater quantities of contaminants, the inventive process will now be explained with reference to FIGS. 3, 4 and 5, although it will be understood that the spirit of the presently claimed invention is in no way limited to these illustrative embodiments.

A detailed discussion of equipment specifications and operating conditions for primary and ancillary equipment suitable for constructing and operating an apparatus in accordance with the present invention can be found in Perry & Green, Perry's Chemical Engineers Handbook, 6th Ed., at Section 20 entitled "Solids Drying and Gas-Solid Systems", the text of which is incorporated herein by reference.

Figure 3:
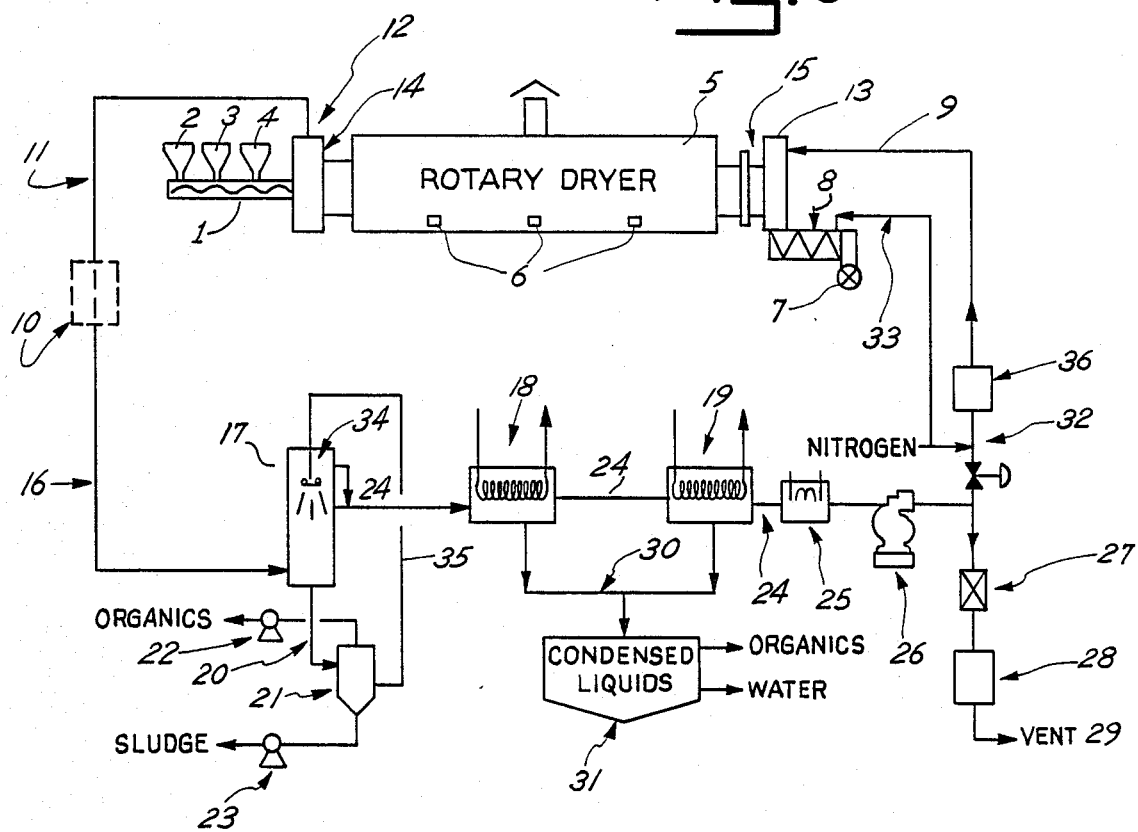
FIG. 3 is a process flow diagram of an exemplary operation which includes recirculation of gas.

A first embodiment, shown in FIG. 3, is one which employs inert gas recycle system.

In FIG. 3 screw conveyor 1 receives feed material from feed material feeder 2. The feed may be preconditioned to improve processability of the feed. The amount and type of pre-conditioning depends, for example, upon whether the feed material is wet or dry. If the feed is wet sludge, pre-conditioning may involve adding detackifiers such as dried processed effluent solids or sand in with feed in feed material feeder 2, or by addition of ash or lime (calcium hydroxide) in a controlled manner in the screw conveyor, for example, from ash feeder 3 or lime feeder 4. The action of the screw conveyor is sufficient to blend the conditioners with the feed material.

The addition of lime to the feed material is not believed to play a direct role in the thermal separation process as contemplated by the present invention, but may facilitate a subsequent stabilization for the dried solids. As a secondary consideration, lime may be added to acidic feed materials to protect the dryer from corrosion.

Screw conveyor 1 feeds the feed material into a substantially air tight rotary dryer 5. A detailed description of types of rotary dryers can be found in Perry's Chemical Engineers' Handbook, mentioned above. Rotary dryer 5 is preferably at a slight incline so that solids move through the dryer by gravity. In addition, or alternatively, movement of feed may be by means of "flights", i.e., projections inside the rotary dryer shell which mix and move the feed as the shell rotates.

Rotary dryer 5 is indirectly heated by means of externally located heaters, i.e., gas burners 6. The burners heat the outer shell of the rotary dryer, which heat is conducted by the metal shell of the rotary dryer to the interior of the dryer. Flights also help in heat transfer. The burners are controlled to supply sufficient heat to carry out the process at a desired rate. Sensors inside the rotary dryer measure average temperature so that the maximum solids temperature is maintained at a desired level not to exceed 425° C.

As the feed is exposed to thermal energy inside the rotary dryer, volatile components are vaporized. The longer the feed remains in the dryer, the more complete the drying, and consequently the greater the degree of decontamination of the solids. By the time the dried solids 7 exit the rotary dryer at the exit side, the desired degree of drying and decontamination has occurred. Conditioners may be added to facilitate handling of the dry effluent solids. For example, water spray 8 may be added to reduce the amount of dust and/or cool the effluent.

Direction of gas flow through the dryer is determined by plant set-up. That is, if recirculating gas is introduced at the same end of the dryer as the feed, and drawn out of the dryer at the end from which treated solids are removed, gas flow will be in the same direction as average solids flow. On the other hand, if the gas is introduced at the end of the dryer from which treated solids are removed, and removed from the end at which feed is introduced, flow will be countercurrent. As shown in FIG. 3, vapors evolved during heating in the rotary dryer are carried out of rotary dryer 5 by means of piping 11 connected to purge outlet 12 at the dryer inlet side. Piping 9 introduces recirculating stripping gas into rotary dryer via inlet 13 at the dryer outlet side. The average flow of gas in the rotary dryer will be in the direction opposite to the direction of flow of the solids, so that a countercurrent flow is established. However, it will be readily apparent that the gas inlet and outlet connections could be reversed so that the average direction of gas flow will be in the same direction as the flow of solids.

Nitrogen is exemplified as the stripping gas used to assist in carrying away evolved vapors from the heated feed, although it will be understood that the present invention may employ any suitable stripping gas. The stripping gas helps remove vapors from rotary dryer 5 thereby lowering the partial pressure of the organic vapor component in the dryer so that vaporization of organic materials may occur at lower vapor pressure. Nitrogen inlet 32 situated upstream of reheater 36 permits heating of startup, makeup, or recirculated nitrogen. Stripping gas may also be introduced directly into the rotary dryer or at the treated solids outlet via nitrogen line 33.

Gas is continuously drawn out of the rotary dryer, consequently the pressure in the dryer is subatmospheric. As a result, if seals 14 and 15 are not air tight, air is drawn into the dryer. This negative air flow will insure that no vapors evolved inside the dryer pass into the atmosphere. This feature also eliminates the necessity for absolutely air tight seals.

The gas phase which leaves the rotary dryer may be comprised of air, steam, volatilized organic materials including halogenated organic materials, and fine solid particles. The gas phase passes from rotary dryer 5 through piping 11. Depending on the amount of fines introduced into in the gas phase by the feed materials, it may be desirable to treat the gas by passing it through an optional intermediate mechanical fines collection device 10 for removal of entrained fine particulate materials. The treated or untreated gases are then conveyed via pipe 16 to spray tower 17. Condensation occurs as the temperature of the gas is cooled to saturation/condensation point of liquids contained therein.

The condensate is drained from spray tower 17 via piping 20 from the bottom of the spray tower to one or more operating separators 21 where the condensate is separated into an oil fraction, a water fraction, and a sludge fraction. The separated out oil fraction is drawn from the separator by means of oil pump 22 and may be pumped, for example, to collection tanks. The separated out water fraction is drawn from the separator by means of water pump 23 and may be pumped, for example, to water collection tanks, or recirculated back to separator 17 via piping 35.

In the spray tower cooling water introduced into the spray tower at the top portion 34 falls to the bottom portion of the spray tower. Gas introduced into the spray tower near the bottom of the spray tower passes to the top of the spray tower. In this manner the gas contacts water and is simultaneously cooled and scrubbed of most liquids and any remaining inert materials. The scrub water carrying the materials stripped from the gas drains from the bottom of the spray tower 17 and is conveyed to a separator 21 by means of piping 20. The liquid in the separator settles to form an organic portion, a water portion and a sludge portion. The water portion may be recirculated back into spray tower 17 by means of piping 35 for reuse as cooling and stripping water.

Gas leaving portion 24 of spray tower 17 may be subject to further cooling and condensation by means of a heat exchanger, i.e., an atmospherically cooled radiator system unit 18, or by means of a refrigeration unit 19, or both. Any residual water or organic material in the gas is condensed in condensers 18 and 19. One, two, or more condensate stages of increasingly lower temperatures may be employed. Condensate is drained and carried by means of piping 30 to condensate storage 31 where the water and organic components are separated. Condensate storage 31 may comprise, for example, settling tanks. The water component may be stored for eventual treatment, or may be recirculated to spray tower 17 for reuse as cooling and stripping water.

Gas which leaves from the top of condenser 19 is constituted primarily of air and nitrogen. This gas passes via piping 47 to reheater 25, then through blower 26. A portion of this gas is directed through calcium carbonate canister 27 and one or more carbon canisters 28 for filtration and stripping prior to exiting the system by means of gas vent 29. The amount of gas discharged may be sufficient to maintain a negative atmospheric pressure in rotary dryer 5.

A major portion of gas leaving blower 26 is conveyed through piping 32 and reheated in heater 36 for return to rotary dryer 5 via piping 9.

Figure 4:
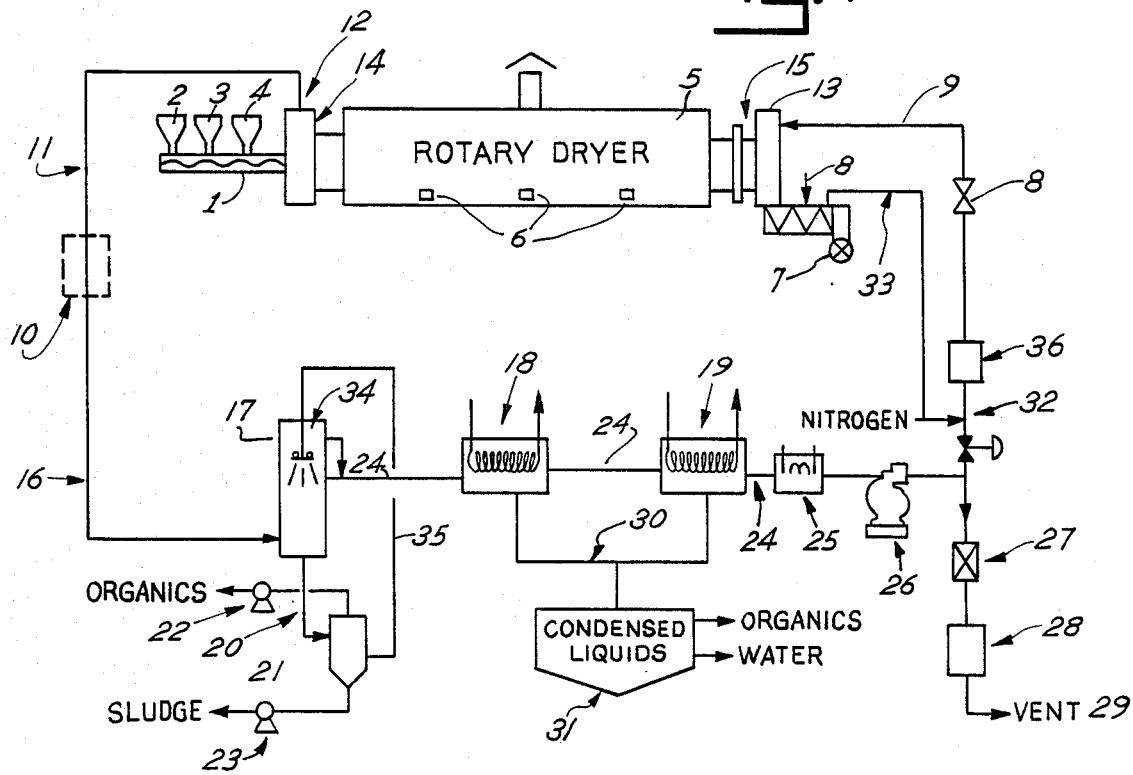
FIG. 4 is a process flow diagram of an exemplary operation without recirculation of gas.

A second embodiment, shown in FIG. 4, is substantially similar to the equipment layout of the embodiment shown in FIG. 3 except for provision of valve 8. Closure of valve 8 results in an embodiment which demonstrates operation without recirculating stripping gas.

To further exemplify and illustrate the present invention, a third embodiment will be described which is completely transportable.

Figure 5:
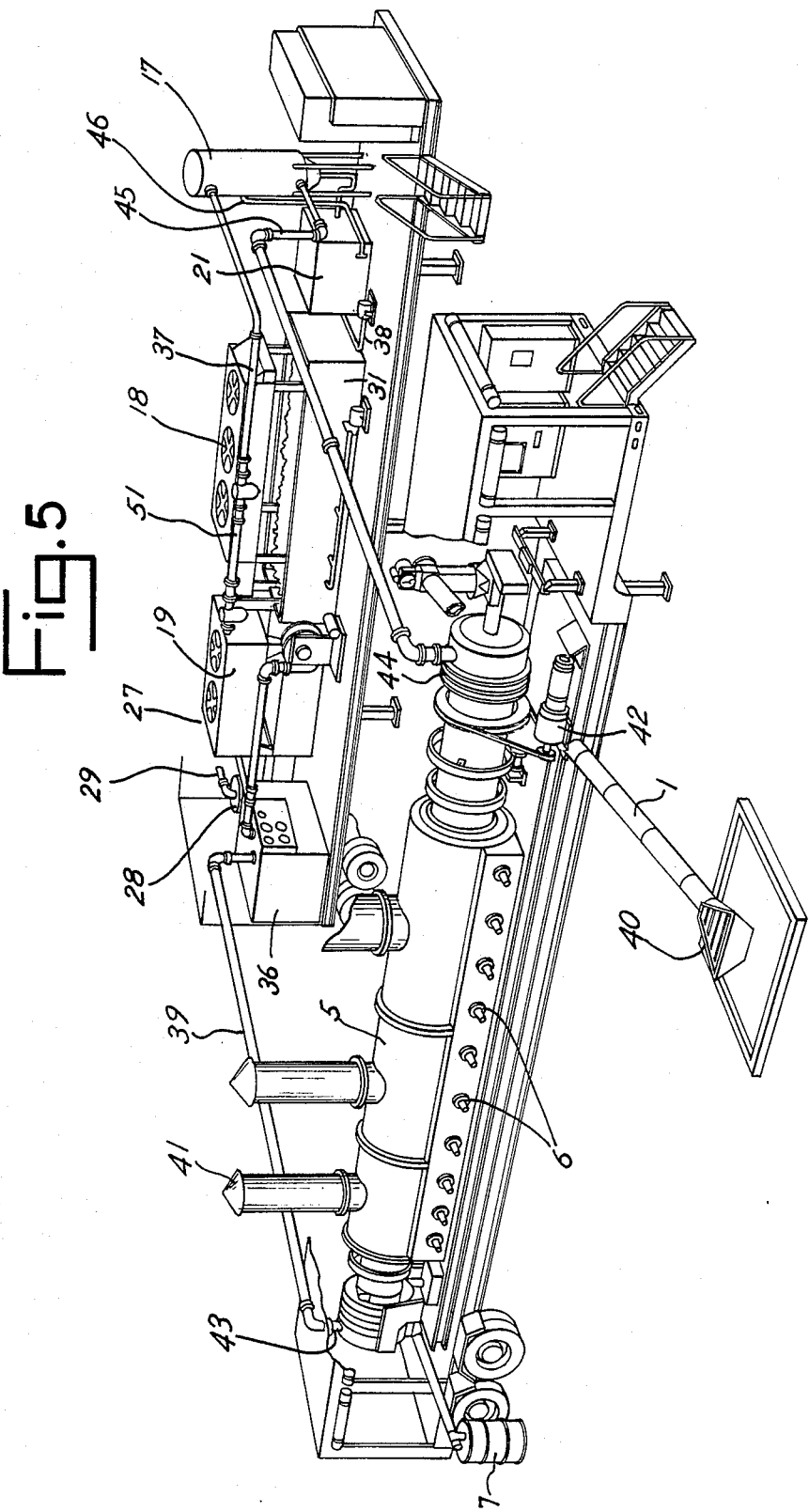
FIG. 5 illustrates a transportable equipment setup showing major components drawn to scale.

The transportable unit shown in FIG. 5 is mounted on two standard 40 foot trailers. By being transportable, the treatment system can be transported to the treatment site and set up substantially as shown in FIG. 5. The capability to treat materials at the treatment site represents a significant improvement in economy in that the cost of transporting large amounts of inert materials from the effected site to a treatment facility such as an incineration facility and back to the treatment site can be avoided.

A shown in FIG. 5 feed to be treated is introduced at feed inlet 40 and conveyed by means of conveyor 1 to rotary dryer 5 at the inlet side. The rotary dryer is indirectly heated by means of gas burners 6 situated outside the shell of the rotary dryer. Exhaust gases exit the system by means of heater exhaust 41. The rotary dryer is rotated by means of motor 42. Solids inside the rotary dryer are conveyed along the axis of the rotary dryer by means of flights inside the rotary dryer, but the trailer may be set at an incline to further facilitate movement of solids toward the exit end.

While in the rotary dryer the thermal energy input causes the temperature of the feed to rise and the liquid component of the feed to volatilize. Stripping gas introduced via gas inlet 43 helps purge rotary dryer 5 of volatilized liquids. The mixture of inert stripping gas, dust, volatilized organic material, steam and air exits rotary dryer 5 through gas exit 44. As a result, average gas flow is maintained along the rotary dryer axis in a direction opposite the direction of the flow of feed, so that a countercurrent flow is maintained. Essentially decontaminated soil leaves the rotary dryer and dryer system at soil exit 7.

Gas leaving the rotary dryer via gas outlet 44 passes through gas handling piping 45 to enter the lower end of spray tower 17. As the gas moves upward in the spray tower to exit through the upper end of the spray tower, it passes through a downward spray of water. The water has the effect of cooling the gas and at the same time stripping the gas of any solid or liquid matter. Water and stripped materials drain from the bottom of the separator to the condensate separator 21. The water phase which separates out in the separator may be recirculated back into spray tower 17 by means of piping 46. The condensate separator 21 may be connected to storage tanks 31 by pipe means 38 for maintenance of water levels in the separator 21 or for startup.

Scrubbed gas leaving spray tower 17 through piping 37 may pass through one or more heat exchangers 18 and/or condensers 19 to further reduce the temperature of the gas and condense any hydrocarbons or water remaining in the gas phase, although operational circumstances such as high or low ambient temperatures may dictate bypassing either the heat exchanger or refrigerated condenser step. Condensate is collected in condensate storage tanks 31 and may pass through pipe 38 to condensate separator 21 for recycling through piping 46 into spray tower 17.

Gas having passed through the desired condensation steps is essentially free of any materials which are liquid or solid at room temperature. A portion of the gas may be discharged to the atmosphere by passing through filter 27, carbon absorption unit 28 and gas outlet 29. Gas to be recycled is preferably preheated in gas heater 36 prior to recirculation through piping 39 back into rotary dryer 5 at gas inlet 43.

While operation of the third exemplary embodiment is explained above without employment of inert stripping gas such as nitrogen, it is readily apparent that the third embodiment may readily be adapted to employ stripping gas in the manner of the second embodiment. Such a transportable system using recycling stripping gas will now be explained in great detail as the fourth embodiment. Since the embodiment combines features discussed above in embodiments one through three, no additional figures are considered necessary. The following specific exemplary operating parameters are based on calculations for processing 5 tons per 24-hour day and using nitrogen stripping gas. If desired, the calculations may be scaled up, for example, for processing of up to about 100 tons per day.

In the transportable system the rotary dryer should be capable of heating the feed material to a maximum temperature of 425° C. for a period of not less than 30 minutes.

The transportable system is capable of accepting feed in the form of pumpable sludge or non-pumpable sludges or solids, but the feed should contain no particles larger than about 1.25 inches in diameter. The feed may typically be comprised of from 10 to 50% water, 1 to 10% organic contaminants, and 30 to 90% inert solids (soils), and as a typical example may be comprised of about 30% water, 5% mixed organics, and 65% soil, but constitution varies greatly depending on the particular treatment site. In the following description of operation of the system, wet contaminated soil is feed at a rate of 273 lb/hr of soil on a dry basis, 126 lb/hr of water, 21 lb/hr of hydrocarbons, and 470 lb/hr of nitrogen gas introduced at a temperature of about 0 to 40 degrees C.

The mobile dryer system is effectively closed, with the only material exiting the system being dried solids exiting from the rotary dryer exit at about 325° C. and vent gas. The system is designed to minimize the potential for fire or explosion throughout the system.

The total system is comprised of two major subsystems; namely, the mobile dryer (low temperature calciner) with feed system and controls, and the process vent gas/condensate system with controls. The two subsystems have two major connection points. First, the vapor discharge from the dryer (provided at the soil inlet end of the dryer to attain a counter current effect) carries evolved steam, organic contaminants, air and inert gas via piping to the condensate subsystem. Second, piping is provided to recycle inert gas, which in this case is nitrogen, back to the dryer.

Prior to return of the gas to the dryer, the gas should be heated to about 225° C. in a reheater reheater.

The dryer operates at a very slight vacuum (typically i.e., a"—" 0.1 to i.e.,a"—" 2.0 inches water column) to assure that any leakage that might occur will draw air into the system and not the reverse. This is to avoid environmental emissions.

A minimum gas velocity (typically 0.5 to 2.0 foot per second) is maintained in the dryer to assure adequate vapor removal from the solids.

Steam and organic contaminant vapors evolved in the dryer and inert gas are drawn off into the vent gas/condensate subsystem. The gas stream leaves the dryer subsystem at about 225° C. and may contain varying amounts of particulates, probably less than 200 microns in diameter, depending on the feed material. The gas containing particulate matter may be passed through a fines separator for removal of fines prior to scrubbing.

The gases are subject to three stages of cooling or condensing. In the first stage, hot gases pass through a spray tower where particulates and most of the oil are removed by the scrubbing influence of sprays of water (about 10 gallons per minute of water). The water containing condensed hydrocarbon and particulate matter drains from the spray tower at a temperature of about 80° C., and is pumped or conveyed to an oil and water separator. The condensed water is filtered and pumped back to the spray tower.

Hot gasses leave the spray tower at about 85° C. and are conveyed to a heat exchanger. At this second cooling stage the gas is cooled to about 50° C. The heat exchanger is a radiator system which accepts heat from the gas and radiates it through a radiator to the ambient air.

The gas which leaves the second condenser/cooler stage passes to a refrigerated condenser stage where the temperature of the gas is lowered to about 5° C. A combined total of about 10.5 lb/hr hydrocarbon and 168 lb/hr condensate drain to the oil/water separator from the second and third stages. Gas which is not condensed after the gas temperature has been lowered in the refrigeration step is primarily nitrogen, and more specifically comprises 470 lb/hr nitrogen, 2.4 lb/hr water, and no hydrocarbons. After cooling to about 5° C. the entire gas stream is heated to about 30 Ⓡ to 35° C. to prevent condensation in the second particulate filter, the carbon absorber and downstream piping.

A portion of the nitrogen may be treated and discharged into the atmosphere, and the balance recirculated back to the dryer. In this example 18 lb/hr nitrogen is first filtered to less than 10 microns, then passed through an activated charcoal absorber, prior to discharged to the atmosphere.

The return nitrogen (about 452 lb/hr) is reheated in a reheater to about 225° C. prior to re-entering the dryer.

Where practical, existing utilities, such as cooling water or electricity may be used. However, since the system is designed to operate in remote areas, it must be capable of operation using portable electric generators.

Water for start-up, electric generators, and fuel for the burners in the dryer may be carried with the portable dryer system. Any mechanical refrigeration required may be provided for as part of the system. Since the electricity will be provided by portable generators, 440 volt motors should be limited to a maximum of 30 horsepower. All system components are preferably able to operate in an unprotected environment. The operating ambient temperature range may be 0° C. to 45° C. The system should be easily drained for freeze protection.

The vent gas/condensate system may include all necessary tankage to store aqueous condensate and organic condensate for further processing, and tankage for any cooling water that may be used for condensing the vapor. The collected aqueous condensate may be stored, treated for disposal, or used as cooling water in the spray tower. Provisions may be made to collect 2 days' production of condensate in two or three separate storage tanks, each designed for one day's operation. Except for initial start-up, the transportable system uses condensed water where cooling water is required.

Variations on the design or operation of the above illustrative embodiments may be readily made to adapt the inventive process to various operational demands, all of which are within the scope and spirit of the present invention.

We claim:

1. A method for separating organic contaminants from contaminated inert solids comprising, in combination, the steps of;
    (a) subjecting inert solids contaminated with organic contaminants to a temperature effective to form an effluent comprising volatized organic contaminants for a period of time to effect the desired degree of separation of contaminants, wherein the temperature is below the incineration temperature of the organic contaminants;
    (b) continuously removing and condensing at least a portion of the effluent; and
    (c) separating the condensate formed in step (b) into water and liquified volatile organic contaminants.

2. A method for separating organic contaminants from contaminated inert solids comprising, in combination, the steps of;
    (a) subjecting inert solids contaminated with organic contaminants to a temperature not exceeding 325° C., to form an effluent comprising volatized organic contaminants, for a period of time to effect the desired degree of separation of contaminants;
    (b) continuously removing and condensing at least a portion of the effluent;
    (c) subjecting at least a portion of noncondensible effluent from step (b) to water scrubbing; and
    (c) separating the condensate formed in step (b) into water and liquified volatile organic contaminants.

3. A method as in claim 1, wherein the temperature employed to effect volatilization is equal to or below 425° C.

4. A method as in claim 1, wherein the temperature employed to effect volatilization is equal to or below 325° C.

5. A method as in claim 1, wherein the temperature employed to effect volatilization is equal to or below 225° C.

6. A method as in claim 1, wherein the contaminants are halogenated organic chemicals.

7. A method as in claim 1, comprising heating the inert solids to at least 325° C. for at least 30 minutes.

8. A method as in claim 1 carried out at a vacuum of from i.e., a"−" 0.1 to i.e., a"−" 2.0 inches water column.

9. A method as in claim 1, further comprising passing an inert gas other than steam through the inert solids at a minimum velocity of 0.5 to 2.0 foot per second.

10. A method as in claim 9, wherein the inert gas is selected from the group consisting of nitrogen, carbon dioxide, helium and argon.

11. A method as in claim 1, wherein the concentration of contaminants after treatment is 25 ppm or less.

12. A method as in claim 1, wherein the concentration of contaminants after treatment is 2 ppm or less.

13. A continuous method for separation of organic contaminants from contaminated inert solid materials comprising
    (a) continuously feeding contaminated inert solid materials to a rotary dryer heated to a temperature of no greater than 425° C. to cause heating and volatilization of organic materials and separation of contaminated inert solid materials into a solids phase free of contaminants and a gas phase containing volatilized contaminants and, depending on feed, possibly fine solid matter,
    (b) continuously discharging said decontaminated solids phase
    (c) in the event that said gas phase contains significant fine solid matter, continuously conducting said gas phase through a means for separating said fine solid matter and separating said fine solid matter from said gas phase,
    (d) conducting the gas phase remaining after step (c) to means for condensing condensable materials contained in said gas phase, and condensing and collecting condensed materials, and
    (e) conducting any gas remaining after step (d) to means for filtering gases, filtering the gas, and discharging said gas to the atmosphere.

14. A continuous method for separation of organic contaminants from contaminated inert solid materials comprising
    (a) continuously feeding contaminated inert solid materials and an inert gas into a rotary dryer heated to a temperature of no greater than 425° C. to cause heating and volatilization of organic materials and separation of contaminated inert solid materials into a solids phase free of contaminants and a gas phase containing said inert gas, volatilized contaminants and, depending on type of feed material, fine solid master,
    (b) continuously discharging said decontaminated solids phase
    (c) if said gas phase contains significant fine particulate matter, continuously conducting said gas phase through a means for separating said fine solid matter and separating said fine solid matter from said gas phase,
    (d) conducting the gas phase remaining after step (c) to means for condensing condensable materials contained in said gas phase, and condensing and collecting condensed materials, and
    (e) conducting the greater portion of any gas remaining after step (d) to means for recirculation of said gas to the dryer and conducting a lesser portion of said gas to means for filtering gases, filtering the gas, and discharging said gas to the atmosphere.

15. An method as in claim 13, wherein the temperature in the rotary dryer is automatically monitored and controlled.

16. An apparatus for separating contaminants from inert materials, comprising
    an essentially air-tight dryer having a soil/sludge material inlet, a solid material outlet, a stripping gas inlet, and a dryer gas outlet,
    a material inlet duct connected to the soil/sludge material inlet and a material outlet duct connected to the solid material outlet,
    means for indirectly heating inert materials inside the dryer,
    means for sensing the temperature inside said rotary dryer, means responsive to said sensing means capable of adjusting said means for indirectly heating to maintain the temperature at a pre-selected temperature above 225° C. but below 425° C., a gas/condensate handling system connected to said dryer gas outlet provided with means to draw gas from the dryer into the gas/condensate handling system through the dryer gas outlet, a spray tower connected to the dryer gas outlet for passing at least one spray of water through the stream of gas from the dryer to thereby strip the gas of most organic contaminants and solid particulates, a condensate collection system connected to said spray tower for collecting and conveying condensate to a condensate storage vessel or vessels, at least one of an air cooled heat exchanger or a refrigerated condenser connected with and situated downstream from the spray tower for further cooling of any gas leaving the spray tower to cause condensation of any remaining water or organic contaminants, a condensate collection system connected to said at least one air cooled heat exchanger or a refrigerated condenser for collecting and conveying this condensate to a condensate separator, a condensate separator for separating the condensate into an organic fraction and a water fraction, and means for sanitizing purge gas prior to purging purge gas into the atmosphere.

17. An apparatus as in claim 16, further comprising an inert gas recycling system comprising means directly or indirectly connected to said dryer for introducing an inert gas into said rotary dryer, means connected to said dryer for drawing gas out of said dryer, and means in order for removing fine solids from said gas, condensing condensable volatiles from said gas, and means connected to said dryer for introducing an inert gas into said rotary dryer.

18. An apparatus as in claim 17 mounted on one or more platforms, said apparatus and platforms being adapted to being transportable.

19. An apparatus as in claim 16 mounted on one or more platforms, said apparatus and platforms being adapted to being transportable.

20. A continuous method for separating organic contaminants from contaminated inert solid material comprising, in combination, the steps of:
 (a) continuously feeding inert solid material comprising sludge contaminated with organic compounds into a rotary dryer heated externally with gas burners, such that the temperature of inert solids is maintained and controlled at a temperature not exceeding 425° C., thereby causing heating and volatilization of the organic compounds;
 (b) rotating the dryer to cause the inert solid material to tumble while passing an inert gas, derived from a non-combustion source, through the dryer and the inert solid material to assist in the separation of the organic compounds from the inert solids;
 (c) continuously removing from the dryer a solids phase free of contaminants and a gas phase comprising the inert gas and volatilized organic compounds;
 (d) conducting the gas phase to means for condensing condensable materials contained in the gas phase;
 (e) condensing and collecting condensable materials in the gas phase; and
 (f) recirculating at least a portion of any of the gas phase remaining after step (e) to the dryer.

21. A method for separating organic contaminants from contaminated inert solids comprising, in combination, the steps of;
 (a) subjecting inert solids contaminated with organic contaminants to a temperature below the incineration temperature effective to volatize the organic contaminants in a dryer for a period of time to effect the desired degree of separation of contaminants;
 (b) continuously removing from the dryer, without internal recirculation of the inert solid material, a solids phase free of contaminants and a gas phase comprising volatilized organic compounds;
 (c) condensing at least a portion of the gas phase;
 (d) separating the condensate formed in step (c) into water and liquified volatile organic contaminants; and
 (e) subjecting at least a portion of the non-condensed gas phase from step (c) to water scrubbing in the absence of oxygen.

22. A continuous method for separating organic contaminants from contaminated inert solid material comprising, in combination, the steps of:
 (a) continuously feeding inert solid material comprising sludge contaminated with organic compounds into a rotary dryer heated externally with gas burners, such that the temperature of inert solids is maintained and controlled at a temperature not exceeding 325° C., thereby causing heating and volatilization of the organic compounds;
 (b) rotating the dryer to cause the inert solid material to tumble while passing an inert gas, derived from a non-combustion source, through the dryer and the inert solid material to assist in the separation of the organic compounds from the inert solids;
 (c) continuously removing from the dryer, without internal recirculation of the inert solid material, a solids phase free of contaminants and a gas phase comprising the inert gas and volatilized organic compounds;
 (d) conducting the gas phase to means for condensing condensible materials contained in the gas phase;
 (e) condensing and collecting condensable materials in the gas phase;
 (f) separating the condensible materials into water and liquified volatile organic contaminants; and
 (g) recirculating at least a portion of any of the gas phase remaining after step (e) to means for scrubbing in the absence of oxygen prior to introduction to the dryer or discharge to the atmosphere.

* * * * *